3,504,018
PROCESS FOR PREPARING PHOSPHONIC ACIDS
Riyad R. Irani, St. Louis, Mo., and Robert E. Mesmer, Oak Ridge, Tenn., assignors to Monsanto Company, St. Louis, Mo., a corporation of Delaware
No Drawing. Filed Dec. 19, 1966, Ser. No. 602,547
Int. Cl. C07d 105/02; C07f 9/02
U.S. Cl. 260—502.4
1 Claim

ABSTRACT OF THE DISCLOSURE

A process for preparing 1-hydroxy, lower alkylidene-1,1-diphosphonic acid which comprises reacting a lower aliphatic monocarboxylic acid such as acetic acid and condensed phosphorous acid such as orthophosphorous acid in a molar ratio of at least 1:1 and at a temperature below 200° C. whereby a normally solid anhydrous reaction product is formed and thereafter recovering said diphosphonic acid from the anhydrous product. In this process substantially no acetyl chloride is produced as a by-product.

---

The present invention relates to processes for preparing phosphonic acids and, more particularly, to a process for preparing 1-hydroxy, lower alkylidene-1,1-diphosphonic acids, especially 1-hydroxy, ethylidene-1,1-diphosphonic acid.

In general, there are two methods for preparing 1-hydroxy, ethylidene-1,1-diphosphonic acid with one method utilizing as reactants orthophosphorous acid and acetyl chloride or acetic anhydride. The other method entails utilizing as reactants phosphorus trichloride and acetic acid. Each of the foregoing methods have numerous limitations among which include, for the phosphorus trichloride and acetic acid method, the formation of acetyl chloride as a by-product which must be separated in some manner in order to recover the desired 1-hydroxy, ethylidene-1,1-diphosphonic acid in acceptable purity and yields. As can be appreciated, therefore, a process for preparing 1-hydroxy, lower alklidene-1,1-diphosphonic acids which, among other things, minimizes or obviates the limitations of the foregoing methods would represent an advancement in this art.

It has now been found that a 1-hydroxy, lower alkylidene-1,1-diphosphonic acid can be prepared advantageously by reacting a condensed phosphorous acid and a lower aliphatic mono-carboxylic acid whereby a normally solid anhydrous reaction product is formed, and thereafter recovering the desired product, 1-hydroxy, lower alkylidene-1,1-diphosphonic acid, from the normally solid anhydrous reaction product as will be more fully discussed hereinafter.

The compounds that can be prepared by the processes of the present invention have the following formula:

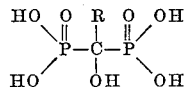

wherein R is a lower alkyl group (1-4 carbon atoms) and are herein generically termed "1-hydroxy, lower alkylidene-1,1-diphosphonic acid." The compounds can also be termed alkane, 1-hydroxy, 1,1-diphosphonic acids. Such compounds have been found to be useful as sequestering agents for heavy metal cations in aqueous systems.

The lower aliphatic mono-carboxylic acids which can be used in the present invention include acetic acid, n-propionic acid, n-butyric acid, isobutyric acid and the like. Moreover, it is also possible to use, as a reactant, a lower aliphatic mono-carboxylic acid containing minor amounts of the corresponding anhydride of the carboxylic acid reactant. For example, mixtures of the carboxylic acid to the corresponding anhydride of from about 10:1 to 1:1 on a weight ratio basis are suitable, such as, a mixture of acetic acid and acetic anhydride in a weight ratio of from about 10:1 to 1:1, respectively.

Condensed phosphorous acid as referred to herein is a phosphorous acid containing substantially no free water and having a $P_4O_6$ content by weight of from greater than 67% to about 75%. When the $P_4O_6$ content by weight is 75% the condensed phosphorous acid is pyrophosphorous acid ($H_4P_2O_5$). When the $P_4O_6$ content by weight is greater than 67% but less than 75% it is believed that the condensed phosphorous acid is comprised of mixtures of orthophosphorous acid and pyrophosphorous acid.

The reaction to prepare the normally solid anhydrous product is temperature dependent to the extent that temperatures above about 200° C. (under atmospheric pressure, although subatmospheric pressures as well as pressures in excess of atmospheric can be used) the yield is extremely low and essentially only degraded or condensed products are formed which do not yield the desired 1-hydroxy, lower alkylidene-1,1-diphosphonic acid. It is preferred that temperatures above about 60° C. be used and it is especially preferred to use temperatures of from about 100° C. to about 160° C.

The reactants can be used in varying amounts depending on such factors as particular reactants, temperature conditions and the like. Generally speaking, it is usually necessary to use at least about 1 mole of carboxylic acid reactant per mole of condensed phosphorous acid reactant. It is preferred to use excess amounts of the carboxylic acid reactant, that is, amounts above about 1 mole of carboxylic acid reactant per mole of condensed phosphorous acid, and excess amounts of the starting carboxylic acid reactant of from about 50% to about 500% are preferred, although amounts in excess of 500% can be used but such amounts do not, in most cases, appear advantageous.

A normally solid (e.g., solid mass at room temperature of about 25° C.) anhydrous reaction product is formed by the foregoing reaction which usually contains, in addition some of the desired product (1-hydroxy, lower alkylidene-1,1-diphosphonic acids) or derivatives thereof, a complex mixture of products believed to be condensed or dehydrated species, such as polymers, of the desired product.

The desired 1-hydroxy, lower alkylidene-1,1-diphosphonic acids can be recovered from the normally solid anhydrous reaction product by many and various known methods which include an alcohol treatment as disclosed and described in Canadian Patent 728,189, dated Feb. 15, 1966, and a water and/or steam treatment as disclosed and described in Canadian Patent 701,850 dated Jan. 12, 1965, which are incorporated herein by reference. It is preferred, however, to recover the desired 1-hydroxy, lower alkylidene-1,1-diphosphonic acids from the normally solid anhydrous reaction product by steaming. The anhydrous reaction product can be treated with steam while being maintained at elevated temperatures, i.e., above about 100° C., and preferably from about 115° C. to about 150° C., and under atmospheric pressure (although sub-atmospheric pressures as well as pressures in excess of atmospheric can be used) thereby volatilizing off carboxylic acids, if present, which can be collected for reuse as a starting material as well as hydrating any of the condensed or dehydrated species of the desired product which may be present. This steaming step yields an aqueous, usually highly concentrated (preferably greater than about 50% by weight), solution or slurry of the desired product.

The steam treatment can be carried out by steaming, that is, by passing or introducing steam (at a temperature at from about 100° C. to about 200° C., preferably in the range of from about 110° C. to about 150° C.) into the anhydrous product in such a manner as to establish intimate contact of the anhydrous product with the steam such as by steam sparging and the like.

Depending upon, inter alia, the reactants used and reaction conditions in some cases (preferably the batch method, infra), it may be necessary to add water to the normally solid anhydrous reaction product prior to recovering the desired product from the normally solid anhydrous reaction product. The amount of water which can be added can vary but is usually in an amount which will cause the exothermic reaction of the anhydrous product (due to the addition of the water) to substantially subside or cease. Such an amount is usually from about 1% to about 40% by weight of the anhydrous product and preferably from about 10% to about 20%.

The 1-hydroxy, lower alkylidene-1,1-diphosphonic acids, normally solid materials, may be recovered from the aqueous medium, if desired, as crystals, by various methods such as, removing the water by evaporation including vacuum evaporation, allowing the compounds to crystallize by cooling a relatively hot saturated aqueous solution, allowing the compounds to crystallize from a saturated solution by seeding the solution, precipitating by the addition of a miscible solvent in which the compounds are less soluble, such as methanol, ethanol, acetone and the like. Usually the amorphous forms of the compounds can be formed when the water of solution is quickly removed under high temperature conditions such as by flash drying, drum drying and the like.

Additionally, if desired, the 1-hydroxy, lower alkylidene-1,1-diphosphonic acid may be recovered from the aqueous medium as a salt by neutralizing the medium with an alkaline material such as the alkali metal hydroxides, carbonates and the like (NaOH, KOH, $Na_2CO_3$ and $K_2CO_3$), the alkaline earth metal hydroxides, carbonates and the like [$Ca(OH)_2$, $Mg(OH)_2$, $CaCO_3$, and $MgCO_3$], ammonium hydroxide, carbonate and the like [$NH_4OH$ and $(NH_4)CO_3$], and water soluble amines such as low molecular weight amines (having a molecular weight below about 300) and more particularly the alkyl amines, alkylene amines and alkanol amines containing not more than 2 amine groups, such as, ethyl amine, diethyl amine, propyl amine, propylene diamine, hexyl amine, 2-ethyl hexyl amine, N-butyl ethanol amine, triethanol amine and the like, and precipitating the corresponding salt therefrom.

The reaction can be carried out by many and various methods. For example, in a batch process, the condensed phosphorous acid reactant can be charged to a suitable reaction vessel equipped with a stirrer and the lower alkyl mono-carboxylic acid reactant added either continuously or intermittently to the acid under agitation while the reactants are heated to prepare the normally solid reaction product and thereafter the product can be steam treated in order to recover the desired 1-hydroxy, lower alkylidene-1,1-diphosphonic acid.

Another method which can be used is a continuous method whereby the reactants are continuously fed into suitable reaction vessels with the rate of feed of the reactants as well as other reaction conditions, such as temperature, used to insure the continuous withdrawal of the desired product. This can be accomplished by, for example, a series of two reaction vessels in which the normally solid reaction product is prepared in a first vessel, then passed to a second vessel in which the steaming step can be performed. The sojourn times in each vessel can be coordinated such that each are about equal, that is, for example, a sojourn time in each vessel of from about 30 to 120 minutes, thus resulting in a relatively continuous passing of reactants into the reaction and exiting of the desired product.

Condensed phosphorous acid can be prepared by different methods although it is preferred to prepare such by adding phosphorus trihalide to a reaction medium selected from the group consisting of water, orthophosphorous acid and admixtures of these under reaction conditions which minimize the formation of separate phases of the reaction medium and the phosphorus trihalide, and under temperature conditions which are below the decomposition of condensed phosphorous acid, that is, below about 130° C., until the reaction product has a $P_4O_6$ content of from greater than 67% by weight to about 75% by weight.

Although condensed phosphorous acid can be prepared in the aforementioned reaction using, in general, any phosphorus trihalide as a reactant, such as phosphorus tribromide, phosphorus triiodide and the like, however, phosphorus trichloride appears to be the most advantageous phosphorus trihalide to use and therefore, the use of phosphorus trichloride is preferred.

As previously mentioned, the conditions of carrying out the hydrolysis reaction are important and especially temperature conditions and reaction conditions, such as, the rate of addition and the degree of agitation. The temperature used has an important influence on the rate of hydrolysis of the phosphorus trichloride in the reaction medium. In general, higher temperatures usually result in a faster hydrolysis rate, however, temperatures in excess of about 130° C. will tend to decompose the condensed phosphorous acid. Although, in general, any temperature less than about 130° C. is suitable, such as, for example, 20° to 30° C., it is preferred that the temperature be maintained above the melting point of pyrophosphorous acid, that is, above 40° C. since the hydrolysis rate is much slower when the pyrophosphorous acid is, to any appreciable degree, in the solid form. When preparing condensed phosphorous acids containing a $P_4O_6$ content of greater than 67% by weight but less than about 70% by weight, it is preferred to maintain the temperature above about 75° C. (the melting point of orthophosphorous acid) in order to maintain a more desired hydrolysis rate and, therefore, a preferred temperature is from about 75° C. to about 130° C. When preparing condensed phosphorous acid having a $P_4O_6$ content above about 70% by weight, it is preferred that temperatures from about 40° C. to about 70° C. be maintained during the hydrolysis reaction.

As previously mentioned, reaction conditions, such as, the rate of addition and degree of agitation are important since these conditions are inter-related to the extent that when using a particular rate of addition of the phosphorus trihalide to the reaction medium sufficient agitation should be used to achieve and/or maintain a relatively homogeneous reactant mixture in order to prevent or minimize the phosphorus trihalide and reaction medium from forming separate phases during the hydrolysis reaction. Since the addition rate and degree of agitation can be varied, it is usually desired, in order to prevent the aforementioned phase separation of the reactants, to use a rate of addition and degree of agitation which does not allow the concentration of the phosphorus trihalide in the reactant mixture to be above about 5% by weight of the reactants. Concentrations as low as about 0.001% by weight of the reactants and even lower can be used, although such is usually not desirable due to the extended length of time necessary for the desired product to be prepared, with the concentration of phosphorus trihalide maintained in the reaction mixture of from about 0.01% to about 1% by weight of the reactants being preferred.

The following examples are presented to illustrate the invention, with parts by weight being used in the examples unless otherwise indicated.

EXAMPLE I

Into a 4-necked flask equipped with a stirrer, thermometer, condenser and dropping funnel are charged about 90 parts of water (5 moles) which is heated to about 50° C. About 275 parts of $PCl_3$ (2 moles) are added to the reaction medium under the surface thereof by way of a dropping funnel at an average rate of about 0.0065 mole $PCl_3$/min. with sufficient agitation (high dispersion stirrer variable between 300 to 1,000 r.p.m.) to prevent a phase separation of the $PCl_3$ and the reaction medium. The temperature of the hydrolysis reaction is maintained at about 50° C. The resulting condensed phosphorous acid is essentially pyrophosphorous acid, $H_4P_2O_5$.

About 200 parts of glacial acetic acid are added to 146 parts of pyrophosphorous acid, prepared as above, in a suitable reaction vessel and the mixture heated at about 135° C. for about 4 hours, thus forming a normally solid anhydrous reaction product. The desired product, 1-hydroxy, ethylidene - 1,1 - diphosphonic acid, is recovered from the anhydrous reaction product by steam sparging while the batch is heated to about 140° C. for about 1 hour.

EXAMPLE II

Into a 4-necked flask equipped with a stirrer, thermometer, condenser and dropping funnel are charged about 144 parts of water (8 moles) which is heated to about 70° C. About 411 parts of $PCl_3$ (3 moles) are added to the reaction medium under the surface thereof at an average rate of addition of about 0.01 mole of $PCl_3$/min. by way of the dropping funnel with sufficient agitation to prevent a phase separation of the $PCl_3$ and the reaction medium. The temperature of the hydrolysis reaction is maintained at about 70° C. At the end of about 5 hours the resulting condensed phosphorous acid analyzes as about 70% by weight $P_4O_6$ (a mixture of about 50% by weight orthophosphorous acid and about 50% by weight of pyrophosphorous acid).

About 500 parts of n-butyric acid are added to about 130 parts of condensed phosphorous acid, prepared as above, in a suitable reaction vessel and the mixture heated at about 160° C. for about 5 hours thus forming a normally solid anhydrous reaction product. The desired product, 1-hydroxy, butylidene-1,1-diphosphonic acid, is recovered by adding about 30 parts of water to the batch at a rate at which the exotherm can be controlled to hold the batch at about 140° C. and thereafter steam sparging is then started and continued for about 1 hour while the batch is heated to about 160° C.

EXAMPLE III

About 90 parts of glacial acetic acid and about 46 parts of acetic anhydride are added to 146 parts of pyrophosphorous acid, prepared as in Example I above, in a suitable reaction vessel and the mixture heated at about 135° C. for about 2 hours, thus forming a normally solid anhydrous reaction product. The desired product, 1-hydroxy, ethylidene-1,1-diphosphonic acid, is recovered from the anhydrous reaction product by steam sparging while the batch is heated to about 140° C. for about 2 hours.

What is claimed is:

1. A process for preparing a 1-hydroxy, ethylidene-1,1-diphosphonic acid which comprises reacting glacial acetic acid and pyrophosphorous acid, in a molar ratio of at least about 1 mole of said acetic acid per mole of pyrophosphorous acid and at a temperature from about 60° C. to about 160° C., whereby a normally solid anhydrous reaction product is formed, and thereafter recovering said 1-hydroxy, ethylidene-1,1-diphosphonic acid from said anhydrous product by steaming.

References Cited

UNITED STATES PATENTS

| | | | |
|---|---|---|---|
| 2,684,286 | 7/1954 | Krieger | 23—165 |
| 3,122,417 | 2/1964 | Blaser et al. | 260—502.4 |
| 3,361,528 | 1/1918 | Shen | 23—165 |
| 3,366,677 | 1/1968 | Quimby | 260—502.4 |
| 3,400,149 | 9/1968 | Quimby et al. | 260—502.4 |
| 3,400,150 | 9/1968 | Whyte et al. | 260—502.4 |

FOREIGN PATENTS

| | | |
|---|---|---|
| 1,148,235 | 5/1963 | Germany. |

OTHER REFERENCES

Merck Index, 6th ed. (1952), p. 7, RS 356 M524.

Van Wazer, "Phosphorus and Its Compounds," vol. 1 (1958), pp. 227, 228, QD 181 P1V3.

Lange, "Handbook of Chemistry," 6th ed. (1946), pp. 230, 231.

LEON ZITVER, Primary Examiner

J. E. EVANS, Assistant Examiner

U.S. Cl. X.R.

23—165; 260—501.12